(12) United States Patent
Fukuoka

(10) Patent No.: US 11,987,180 B2
(45) Date of Patent: May 21, 2024

(54) SHOVEL

(71) Applicant: SUMITOMO CONSTRUCTION MACHINERY CO., LTD., Tokyo (JP)

(72) Inventor: Toshiki Fukuoka, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 906 days.

(21) Appl. No.: 17/034,520

(22) Filed: Sep. 28, 2020

(65) Prior Publication Data

US 2021/0010243 A1    Jan. 14, 2021

Related U.S. Application Data

(63) Continuation of application No. PCT/JP2019/013258, filed on Mar. 27, 2019.

(30) Foreign Application Priority Data

Mar. 30, 2018    (JP) ................. 2018-067931

(51) Int. Cl.
*G08G 1/123*    (2006.01)
*B60Q 5/00*    (2006.01)
(Continued)

(52) U.S. Cl.
CPC ............. *B60Q 9/008* (2013.01); *B60Q 5/006* (2013.01); *B60R 1/00* (2013.01); *E02F 9/16* (2013.01);
(Continued)

(58) Field of Classification Search
CPC .... B60Q 9/008; B60Q 5/006; B60Q 2800/20; B60R 1/00; B60R 2300/105;
(Continued)

(56) References Cited

U.S. PATENT DOCUMENTS 8,917,292 B2 * 12/2014 Gotou ................. E02F 9/267
348/148
9,113,047 B2    8/2015 Onuma et al.
(Continued)

FOREIGN PATENT DOCUMENTS

DE    112015000292    11/2016
EP    2642250    9/2013
(Continued)

OTHER PUBLICATIONS

International Search Report for PCT/JP2019/013258 dated Jun. 25, 2019.

*Primary Examiner* — Anh V La
(74) *Attorney, Agent, or Firm* — IPUSA, PLLC

(57) ABSTRACT

A shovel includes a lower traveling body, an upper turning body turnably mounted on the lower traveling body, a cab mounted on the upper turning body, multiple image capturing devices mounted on the upper turning body, a display device provided in the cab, and an operation part provided in the cab. The display device includes an image display part configured to display a captured image captured by at least one of the image capturing devices and a menu screen. The image display part is configured to display the menu screen while displaying the captured image, in response to the operation part being operated.

14 Claims, 11 Drawing Sheets

(51) Int. Cl.
  *B60Q 9/00* (2006.01)
  *B60R 1/00* (2022.01)
  *E02F 9/16* (2006.01)
  *E02F 9/20* (2006.01)
  *E02F 9/24* (2006.01)
  *E02F 9/26* (2006.01)
  *E02F 3/32* (2006.01)
  *E02F 9/22* (2006.01)

(52) U.S. Cl.
  CPC ............. *E02F 9/2004* (2013.01); *E02F 9/24* (2013.01); *E02F 9/261* (2013.01); *B60R 2300/105* (2013.01); *B60R 2300/207* (2013.01); *B60R 2300/306* (2013.01); *B60R 2300/8093* (2013.01); *E02F 3/32* (2013.01); *E02F 9/2228* (2013.01); *E02F 9/2235* (2013.01); *E02F 9/2285* (2013.01); *E02F 9/2292* (2013.01); *E02F 9/2296* (2013.01)

(58) Field of Classification Search
  CPC ........ B60R 2300/207; B60R 2300/306; B60R 2300/8093; E02F 9/16; E02F 9/2004; E02F 9/24; E02F 9/261; E02F 3/32; E02F 9/2228; E02F 9/2235; E02F 9/2285; E02F 9/2292; E02F 9/2296; E02F 9/26; H04N 7/18
  USPC ................ 340/995.17, 995.1, 990, 989, 988
  See application file for complete search history.

(56) References Cited

U.S. PATENT DOCUMENTS

| | | | |
|---|---|---|---|
| 9,381,194 | B2 | 7/2016 | Fan et al. |
| 10,717,200 | B2 | 7/2020 | Machida et al. |
| 2003/0001751 | A1 | 1/2003 | Ogura et al. |
| 2005/0151845 | A1* | 7/2005 | Tsukada ................... E02F 9/26 |
| | | | 348/148 |
| 2007/0008189 | A1 | 1/2007 | Amari et al. |
| 2017/0030054 | A1 | 2/2017 | Okumura et al. |
| 2017/0089042 | A1* | 3/2017 | Machida ................ H04N 7/181 |
| 2018/0080198 | A1 | 3/2018 | Machida et al. |
| 2019/0003155 | A1 | 1/2019 | Kurogi et al. |

FOREIGN PATENT DOCUMENTS

| | | |
|---|---|---|
| JP | 2003-128386 | 5/2003 |
| JP | 2007-040971 | 2/2007 |
| JP | 2013-067626 | 4/2013 |
| JP | 2015-209691 | 11/2015 |
| WO | 2002/040783 | 5/2002 |
| WO | 2012/053105 | 4/2012 |
| WO | 2016/174754 | 11/2016 |
| WO | 2016/174953 | 11/2016 |
| WO | 2017/191853 | 11/2017 |

* cited by examiner

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/013258, filed on Mar. 27, 2019 and designating the U.S., which claims priority to Japanese patent application No. 2018-067931, filed on Mar. 30, 2018. The entire contents of the foregoing applications are incorporated herein by reference.

BACKGROUND

Technical Field

The present invention relates to shovels.

Description of Related Art

A shovel including a display device that displays a menu screen for checking various kinds of information on and changing various settings of the shovel has been known.

SUMMARY

According to an embodiment of the present invention, a shovel includes a lower traveling body, an upper turning body turnably mounted on the lower traveling body, a cab mounted on the upper turning body, multiple image capturing devices mounted on the upper turning body, a display device provided in the cab, and an operation part provided in the cab. The display device includes an image display part configured to display a captured image captured by at least one of the image capturing devices and a menu screen. The image display part is configured to display the menu screen while displaying the captured image, in response to the operation part being operated.

DETAILED DESCRIPTION

Figure 1:
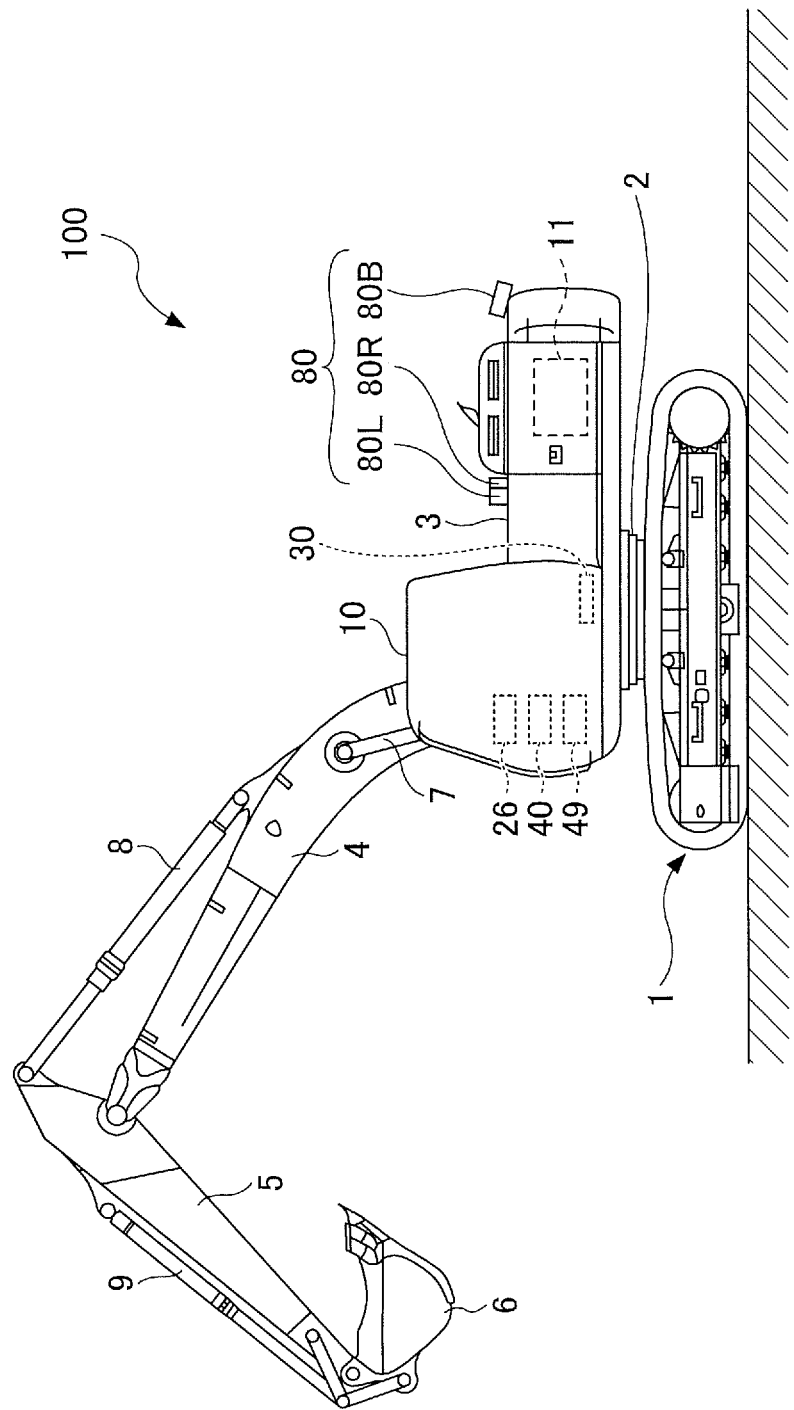
FIG. 1 is a diagram illustrating an example configuration of a shovel according to an embodiment of the present invention.

As described above, a shovel including a display device that displays a menu screen has been known. According to the display device that displays a menu screen, when the shovel is operated during the display of the menu screen, the menu screen switches to an image for understanding the surroundings of the shovel, such as an overhead view image, which prevents an operator from operating the shovel while looking at the menu screen.

According to an aspect of the present invention, a shovel that an operator can operate while looking at a menu screen is provided.

According to an aspect of the present invention, an operator can operate a shovel while looking at a menu screen.

An embodiment of the invention is described below with reference to the drawings. In the drawings, the same elements are referred to using the same reference numeral, and duplicate description thereof may be omitted.

Figure 2:
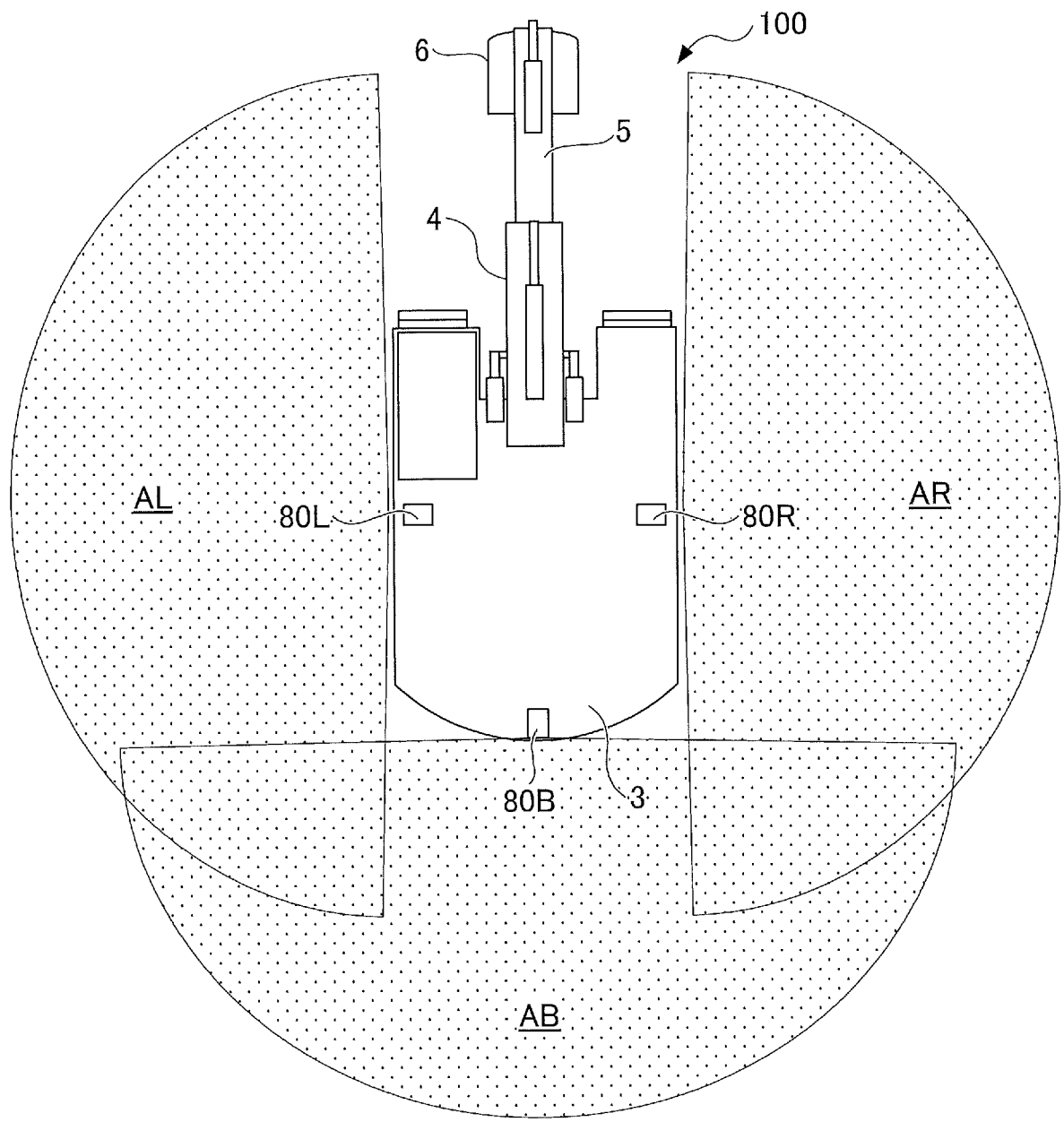
FIG. 2 is a plan view of the shovel of FIG. 1.

First, a shovel as an excavator according to an embodiment of the present invention is described with reference to FIGS. 1 and 2. FIG. 1 is a diagram illustrating an example configuration of the shovel according to the embodiment of the present invention. FIG. 2 is a plan view of the shovel of FIG. 1.

As illustrated in FIG. 1, according to a shovel 100, an upper turning body 3 is turnably mounted on a crawler-type lower traveling body 1 via a turning mechanism 2. A boom 4 serving as a work element is attached to the upper turning body 3. An arm 5 serving as a work element is attached to the distal end of the boom 4. A bucket 6 serving as a work element and an end attachment is attached to the distal end of the arm 5. The boom 4 is driven by a boom cylinder 7. The arm 5 is driven by an arm cylinder 8. The bucket 6 is driven by a bucket cylinder 9.

A cabin 10 serving as a cab is provided and a power source such as an engine 11 is mounted on the upper turning body 3. Furthermore, a turning hydraulic motor, a controller 30, an image capturing device 80, etc., are attached to the upper turning body 3. The turning hydraulic motor may alternatively be a turning motor generator.

An operating apparatus 26, a display device 40, an alarm device 49, etc., are provided in the cabin 10. In this specification, for convenience, the side of the upper turning body 3 on which the work elements such as the boom 4 are attached is defined as the front, and the side of the upper turning body 3 on which a counterweight is attached is defined as the back.

The controller 30 is configured to be able to control the shovel 100. According to the example of FIG. 1, the controller 30 is constituted of a computer including a CPU, a RAM, an NVRAM, and a ROM. In this case, the controller 30 reads programs corresponding to functional elements from the ROM, loads the programs into the RAM, and causes the CPU to execute corresponding processes. The functional elements may also be constituted of hardware or constituted of a combination of software and hardware.

The image capturing device 80 is configured to capture an image of an area surrounding the shovel 100. Examples of the image capturing device 80 include a monocular camera, a stereo camera, a distance image camera, an infrared camera, and a LiDAR. According to the example of FIG. 1, the image capturing device 80 includes a back camera 80B attached to the back end of the upper surface of the upper turning body 3, a left camera 80L attached to the left end of the upper surface of the upper turning body 3, and a right camera 80R attached to the right end of the upper surface of the upper turning body 3.

The back camera 80B, the left camera 80L, and the right camera 80R are attached to the upper turning body 3 such that their respective optical axes point obliquely downward and their respective imaging ranges include part of the upper turning body 3. Therefore, the imaging range of each of the back camera 80B, the left camera 80L, and the right camera 80R has, for example, an angle of view of approximately 180 degrees in a plan view. According to the example of FIG. 2, an imaging range AB represents an example of the imaging range of the back camera 80B, an imaging range AL represents an example of the imaging range of the left camera 80L, and an imaging range AR represents an example of the imaging range of the right camera 80R.

The image capturing device 80 may also operate as an object detector that detects a predetermined object in a predetermined area in an area surrounding the shovel 100. In this case, the image capturing device 80 may include an image processor. The image processor performs known image processing on an image captured by the image capturing device 80 (input image) to detect an image of a predetermined object included in the input image. In response to detecting an image of the predetermined object, the image capturing device 80 outputs an object detection signal to the controller 30. The predetermined object is, for example, a person, an animal, a vehicle, a machine or the like. The image processor may also be configured to detect a moving body. The image processor may be integrated with the controller 30. The object detector may also be a LIDAR, an ultrasonic sensor, a millimeter wave sensor, a laser radar sensor, an infrared sensor, or the like.

Furthermore, the shovel 100 may be configured to be provided with an objector detector (a LIDAR, a millimeter wave radar, a stereo camera, or the like) serving as an object detecting part, aside from the image capturing device 80 (the back camera 80B, the left camera 80L, and the right camera 80R). In this case, the shovel 100 may display information on an object detected by the object detector on the display device 40.

Figure 3:
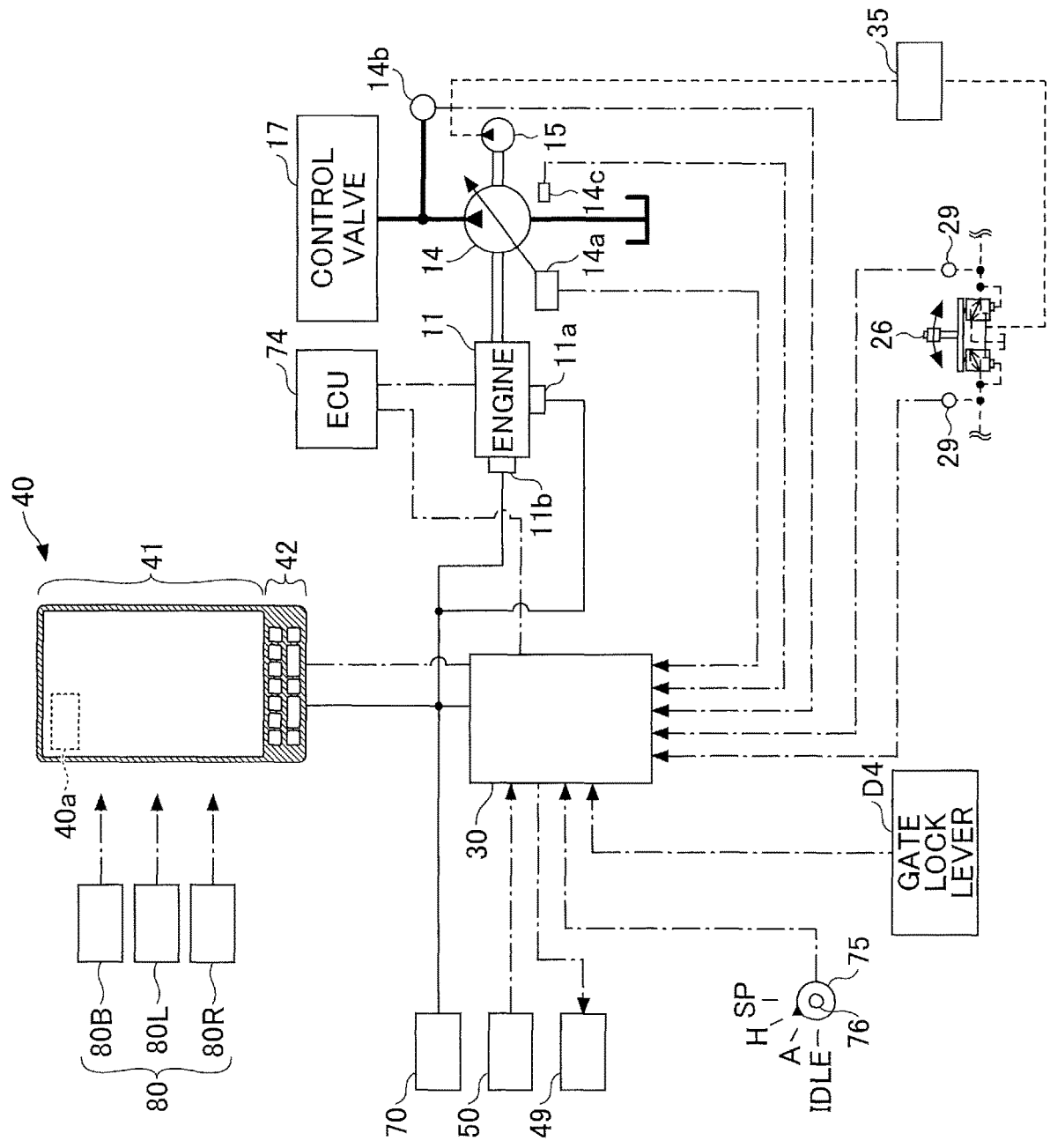
FIG. 3 is a diagram illustrating an example configuration of a basic system installed in the shovel of FIG. 1.

Next, a basic system installed in the shovel 100 of FIG. 1 is described with reference to FIG. 3. FIG. 3 illustrates an example configuration of the basic system installed in the shovel 100 of FIG. 1. In FIG. 3, a mechanical power transmission line, a hydraulic oil line, a pilot line, an electric power line, and an electric control line are indicated by a double line, a thick solid line, a dashed line, a thin solid line, and a one-dot chain line, respectively.

As illustrated in FIG. 3, the basic system mainly includes the engine 11, a main pump 14, a pilot pump 15, a control valve 17, the operating apparatus 26, an operating pressure sensor 29, the controller 30, a selector valve 35, the display device 40, the alarm device 49, an engine rotational speed adjustment dial 75, and an output characteristic change switch 76.

The engine 11 is a diesel engine that adopts isochronous control to maintain a constant engine rotational speed irrespective of an increase or decrease in a load. The amount of fuel injection, the timing of fuel injection, boost pressure, etc., in the engine 11 are controlled by an engine control unit (ECU 74).

The engine 11 is connected to each of the main pump 14 and the pilot pump 15 serving as hydraulic pumps. The main pump 14 is connected to the control valve 17 via a hydraulic oil line.

The control valve 17 is a hydraulic control device that controls the hydraulic system of the shovel 100. The control valve 17 is connected to hydraulic actuators such as a left travel hydraulic motor, a right travel hydraulic motor, the boom cylinder 7, the arm cylinder 8, the bucket cylinder 9, and the turning hydraulic motor.

Specifically, the control valve 17 includes spool valves corresponding to the hydraulic actuators. Each spool valve is configured to be able to change its position according to a pilot pressure so as to be able to increase and decrease the opening area of a PC port and the opening area of a CT port. The PC port is a port that causes the main pump 14 to communicate with a hydraulic actuator. The CT port is a port that causes a hydraulic actuator to communicate with a hydraulic oil tank.

The pilot pump 15 is connected to the operating apparatus 26 via a pilot line. The operating apparatus 26 includes, for example, a left operating lever, a right operating lever, and a travel operating apparatus. The travel operating apparatus includes, for example, a travel lever and a travel pedal. According to this embodiment, each operating apparatus 26 is a hydraulic operating apparatus and is connected to the pilot ports of a corresponding spool valve in the control valve 17 via a pilot line. The operating apparatus 26 may alternatively be an electric operating apparatus.

The operating pressure sensor 29 detects the details of the operation of the operating apparatus 26 in the form of pressure. The operating pressure sensor 29 outputs a detection value to the controller 30. The details of the operation of the operating apparatus 26 may also be electrically detected.

The selector valve 35 is configured to be able to switch the enabled state and the disabled state of the operating apparatus 26. The enabled state of the operating apparatus 26 is a state where an operator can operate hydraulic actuators using the operating apparatus 26. The disabled state of the operating apparatus 26 is a state where the operator cannot operate hydraulic actuators using the operating apparatus 26. According to this embodiment, the selector valve 35 is a gate lock valve configured to operate in accordance with a command from the controller 30. Specifically, the selector valve 35 is placed in a pilot line connecting the pilot pump 15 and the operating apparatus 26, and is configured to be able to switch the closing and opening of the pilot line in response to a command from the controller 30. For example, the operating apparatus 26 is enabled when a gate lock lever D4 is pulled up to open the selector valve 35 (gate lock valve), and is disabled when the gate lock lever D4 is pushed down to close the selector valve 35 (gate lock valve).

The display device 40 is configured to display various kinds of information. The display device 40 may be connected to the controller 30 via a communications network such as a CAN or may be connected to the controller 30 via a dedicated line. According to this embodiment, the display device 40 is configured to be able to display one or more captured images captured by the image capturing device 80 and a menu screen. The display device 40 is supplied with electric power from a rechargeable battery 70 to operate. The display device 40 includes a control part 40a, an image display part 41, and an operation part 42.

The control part 40a controls an image displayed on the image display part 41. According to this embodiment, the control part 40a is constituted of a computer including a CPU, a RAM, an NVRAM, and a ROM. In this case, the control part 40a reads programs corresponding to functional elements from the ROM, loads the programs into the RAM, and causes the CPU to execute corresponding processes. The functional elements may also be constituted of hardware or constituted of a combination of software and hardware. An image displayed on the image display part 41 may also be controlled by the controller 30 or the image capturing device 80.

The image display part 41 displays a captured image captured by at least one image capturing device 80 and a menu screen. The captured image may be, for example, a backward image captured by the back camera 80B, a leftward image captured by the left camera 80L, or a rightward image captured by the right camera 80R. The captured image may also be, for example, an overhead view image into which captured images captured by the back camera 80B, the left camera 80L, and the right camera 80R, respectively, are combined. The captured image may be two or more selected from the backward image, the leftward image, the rightward image, and the overhead view image. The menu screen includes a condition screen showing the condition of the shovel 100 and a settings screen showing the various settings of the shovel 100.

The operation part 42 is a switch panel including hardware switches. The operation part 42 may be a touchscreen. According to this embodiment, the operation part 42 is placed below the image display part 41 and includes a switch (for example, a menu switch) for changing images displayed on the image display part 41. The placement of the operation part 42 is not limited to the above-described example, and the operation part 42 may be placed at an operating lever or may be placed on a seat left side console on the left side or a seat right side console on the right side of an operator seat. Here, in addition to the operation part 42 provided on the display device 40, an operator seat side operation part 50 having the same functions as the operation part 42 may be placed on at least one of an operating lever, the seat left side console, and the seat right side console.

According to this embodiment, the image display part 41 displays the menu screen when the menu switch of the operation part 42 is operated during display of an overhead view image FV and a backward image CBT captured by the image capturing device 80. For example, the image display part 41 reduces the size of the backward image CBT and displays a screen for selecting a menu specific item without changing the size of the overhead view image FV before and after the operation of the menu switch of the operation part 42. When a predetermined switch of the operation part 42 is operated with the screen for selecting a menu specific item being displayed, the image display part 41 switches the backward image CBT to the menu screen such as a condition screen showing the condition of the shovel 100, a settings screen showing the various settings of the shovel 100, or the like. At this point, the image display part 41 displays the overhead view image FV while making no change in and keeping the size of the overhead view image.

Furthermore, the image display part 41 may be configured to display the menu screen in response to the operation of the menu switch of the operation part 42 irrespective of whether the shovel 100 is operable or inoperable. Furthermore, the image display part 41 may also be configured to display the menu screen in response to the operation of the menu switch of the operation part 42 only when the shovel 100 is inoperable. Furthermore, these may be switched with a switch part such as a selector switch, for example. The shovel 100 is operable, for example, when the operating apparatus 26 is enabled with the gate lock lever D4 being pulled up to open the selector valve 35. The shovel 100 is inoperable, for example, when the operating apparatus 26 is disabled with the gate lock lever D4 being pushed down to close the selector valve 35.

The rechargeable battery 70 is, for example, charged with electricity generated in an alternator 11a. The electric power of the rechargeable battery 70 is also supplied to the controller 30, etc. For example, a starter 11b of the engine 11 is driven with electric power from the rechargeable battery 70 to start the engine 11.

The ECU 74 transmits data on the condition of the engine 11, such as coolant water temperature, to the controller 30. A regulator 14a of the main pump 14 transmits data on a swash plate tilt angle to the controller 30. A discharge pressure sensor 14b transmits data on the discharge pressure of the main pump 14 to the controller 30. An oil temperature sensor 14c provided in a conduit between the hydraulic oil tank and the main pump 14 transmits data on the temperature of hydraulic oil flowing through the conduit to the controller 30. The operating pressure sensor 29 transmits data on a pilot pressure generated in response to the operation of the operating apparatus 26 to the controller 30. The controller 30 stores these data in a temporary storage part (memory) and can transmit these data to the display device 40 when needed.

The engine rotational speed adjustment dial 75 is a dial for adjusting the rotational speed of the engine 11. The engine rotational speed adjustment dial 75 transmits data on the setting of the engine rotational speed to the controller 30. The engine rotational speed adjustment dial 75 is configured to allow the engine rotational speed to be selected from among the four levels of SP mode, H mode, A mode, and IDLE mode. The SP mode is a rotational speed mode selected when it is desired to prioritize workload, and uses the highest engine rotational speed. The H mode is a rotational speed mode selected when it is desired to balance workload and fuel efficiency, and uses the second highest engine rotational speed. The A mode is a rotational speed mode selected when it is desired to operate the shovel at low noise while prioritizing fuel efficiency, and uses the third highest engine rotational speed. The IDLE mode is a rotational speed mode selected when it is desired to idle the engine 11, and uses the lowest engine rotational speed. The engine 11 is controlled to a constant rotational speed corresponding to a rotational speed mode set by the engine rotational speed adjustment dial 75. The engine rotational speed adjustment dial 75 is provided with the output characteristic change switch 76. The output characteristic of the shovel 100 can be changed by depressing the output characteristic change switch 76. For example, an engine output torque diagram may be changed or the engine rotational speed may be reduced by a predetermined value at each level of the engine rotational speed adjustment dial 75 with the output characteristic change switch 76.

The alarm device 49 is a device for calling the attention of a person engaged in the work of the shovel 100. The alarm device 49 is constituted of, for example, a combination of an interior alarm device and an exterior alarm device. The interior alarm device is a device for calling the attention of the operator of the shovel 100 in the cabin 10, and includes, for example, at least one of an audio output device, a vibration generator, and a light emitter provided in the cabin 10. The interior alarm device may also be the display device 40. The exterior alarm device is a device for calling the attention of a worker who works in an area surrounding the shovel 100, and includes, for example, at least one of an audio output device and a light emitter provided outside the cabin 10. An audio output device serving as the exterior alarm device includes, for example, a travel alarm device attached to the bottom surface of the upper turning body 3. Furthermore, the exterior alarm device may also be a light emitter provided on the upper turning body 3. The exterior alarm device may be omitted. For example, when the image capturing device 80 operating as an object detector detects a predetermined object, the alarm device 49 may so notify a person engaged in the work of the shovel 100.

Figure 4:
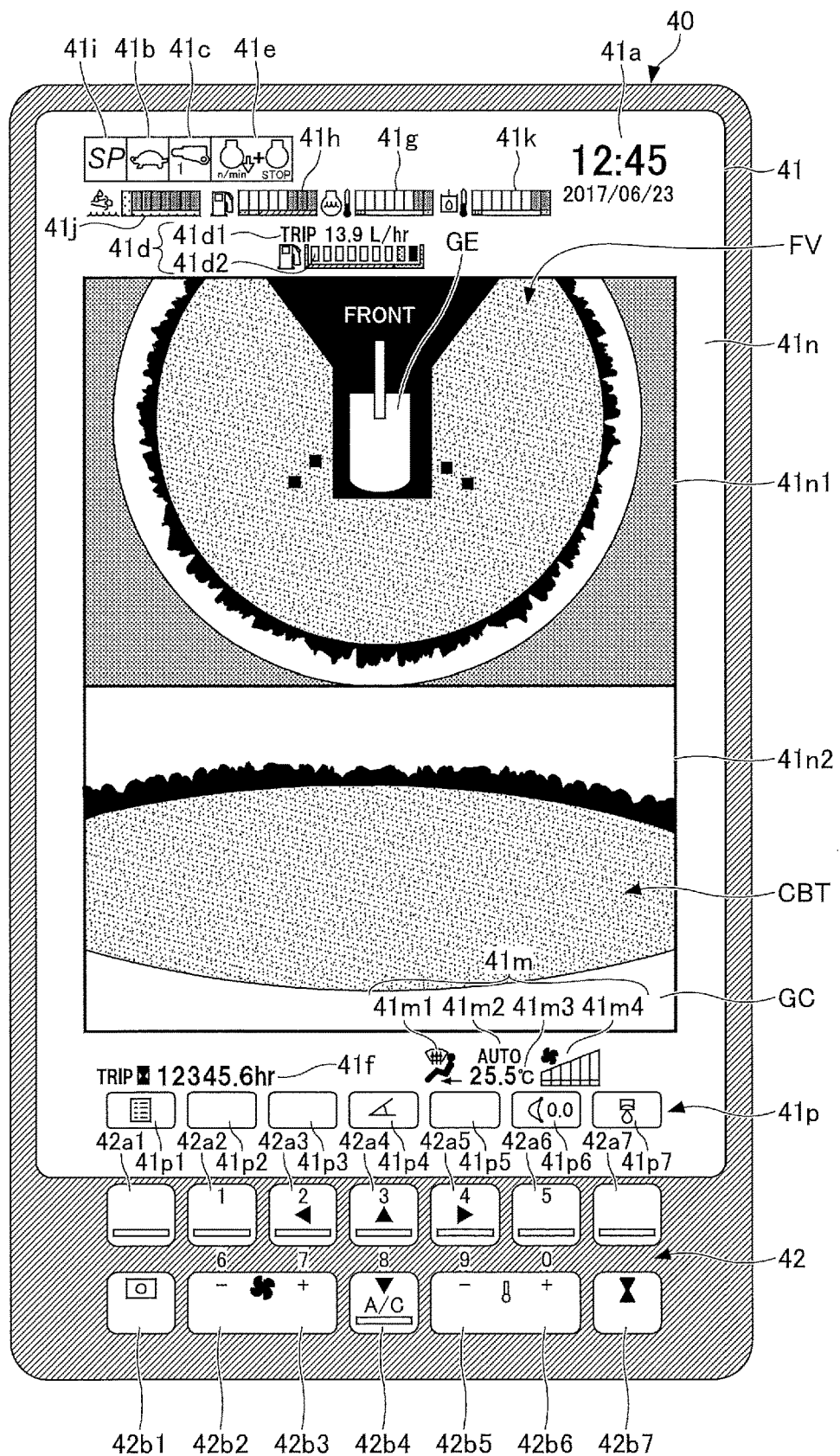
FIG. 4 is a diagram illustrating an example configuration of an image display part and an operation part of a display device.

Next, an example configuration of the image display part 41 and the operation part 42 of the display device 40 is described with reference to FIG. 4. FIG. 4 is a diagram illustrating an example configuration of the image display part 41 and the operation part 42 of the display device 40. The example of FIG. 4 illustrates that an overhead view image and a backward image are displayed on the image display part 41 as images before the operation of the menu switch of the operation part 42.

First, the image display part 41 is described. As illustrated in FIG. 4, the image display part 41 includes a date and time display area 41a, a travel mode display area 41b, an attachment display area 41c, a fuel efficiency display area 41d, an engine control status display area 41e, an engine operating time display area 41f, a coolant water temperature display area 41g, a remaining fuel amount display area 41h, a rotational speed mode display area 41i, a remaining aqueous urea solution amount display area 41j, a hydraulic oil temperature display area 41k, an air conditioner operating condition display area 41m, an image display area 41n, and a menu display area 41p.

The travel mode display area 41b, the attachment display area 41c, the engine control status display area 41e, the rotational speed mode display area 41i, and the air conditioner operating condition display area 41m are areas for displaying settings information that is information on the settings of the shovel 100. The fuel efficiency display area 41d, the engine operating time display area 41f, the coolant water temperature display area 41g, the remaining fuel amount display area 41h, the remaining aqueous urea solution amount display area 41j, and the hydraulic oil temperature display area 41k are areas for displaying operating condition information that is information on the operating condition of the shovel 100.

Specifically, the date and time display area 41a is an area for displaying a current date and time. The travel mode display area 41b is an area for displaying a current travel mode. The attachment display area 41c is an area for displaying an image that represents a currently attached attachment. The fuel efficiency display area 41d is an area for displaying fuel efficiency information calculated by the controller 30. The fuel efficiency display area 41d includes an average fuel efficiency display area 41d1 for displaying a lifelong average fuel efficiency or section average fuel efficiency and an instantaneous fuel efficiency display area 41d2 for displaying instantaneous fuel efficiency.

The engine control status display area 41e is an area for displaying the control status of the engine 11. The engine operating time display area 41f is an area for displaying the cumulative operating time of the engine 11. The coolant water temperature display area 41g is an area for displaying a current temperature condition of engine coolant water. The remaining fuel amount display area 41h is an area for displaying the state of the remaining amount of fuel stored in a fuel tank. The rotational speed mode display area 41i is an area for displaying, as an image, a current rotational speed mode set with the engine rotational speed adjustment dial 75. The remaining aqueous urea solution amount display area 41j is an area for displaying, as an image, the state of the remaining amount of an aqueous urea solution stored in an aqueous urea solution tank. The hydraulic oil temperature display area 41k is an area for displaying the state of the temperature of hydraulic oil in the hydraulic oil tank.

The air conditioner operating condition display area 41m includes a vent display area 41m1 for displaying the position of a current vent, an operating mode display area 41m2 for displaying a current operating mode, a temperature display area 41m3 for displaying a current set temperature, and an air volume display area 41m4 for displaying a current set air volume.

The image display area 41n is an area for displaying an image captured by the image capturing device 80. According to the example of FIG. 4, the image display area 41n displays the overhead view image FV and the backward image CBT. The overhead view image FV is a virtual viewpoint image generated by the control part 40a, and is generated based on the respective captured images of the back camera 80B, the left camera 80L, and the right camera 80R. A shovel graphic GE corresponding to the shovel 100 is centered in the overhead view image FV in order to cause the operator to more intuitively understand the positional relationship between the shovel 100 and an object present in an area surrounding the shovel 100. The backward image CBT is an image showing a space behind the shovel 100 and includes a counterweight image GC. The backward image CBT is an actual viewpoint image generated by the control part 40a, and is generated based on an image captured by the back camera 80B.

Furthermore, the image display area 41n includes a first image display area 41n1 at an upper position and a second image display area 41n2 at a lower position. According to the example of FIG. 4, the overhead view image FV is placed in the first image display area 41n1, and the backward image CBT is placed in the second image display area 41n2. According to the image display area 41n, however, the overhead view image FV may be placed in the second image display area 41n2 and the backward image CBT may be placed in the first image display area 41n1. Furthermore, the overhead view image FV and the backward image CBT, which are vertically arranged next to each other according to the example of FIG. 4, may be vertically spaced apart from each other. Furthermore, the image display area 41n, which is a vertically elongated area according to the example of FIG. 4, may be a laterally elongated area. When the image display area 41n is a laterally elongated area, the overhead view image FV may be placed as the first image display area 41n1 on the left side and the backward image CBT may be placed as the second image display area 41n2 on the right side in the image display area 41n. In this case, the overhead view image FV and the backward image CBT may be laterally spaced apart from each other or their positions may be interchanged.

The menu display area 41p includes tabs 41p1 through 41p7. According to the example of FIG. 4, the 41p1 through 41p7 are laterally spaced apart from each other at the bottom of the image display part 41. Icons for displaying various kinds of information are displayed on the tabs 41p1 through 41p7.

A menu specific item icon for displaying menu specific items is displayed on the tab 41p1. When the operator selects the tab 41p1, the icons displayed on the tabs 41p2 through 41p7 switch to icons associated with menu specific items.

An icon for displaying information on a digital level is displayed on the tab 41p4. When the operator selects the tab 41p4, the backward image CBT switches to a screen showing information on a digital level. The screen showing information on a digital level may also be displayed, however, by being superimposed on the backward image CBT or through reduction in the size of the backward image CBT. Furthermore, the overhead view image FV may be switched to the screen showing information on a digital level, or the screen showing information on a digital level may be displayed by being superimposed on the overhead view image FV or through reduction in the size of the overhead view image FV.

An icon for displaying information on intelligent construction is displayed on the tab 41p6. When the operator selects the tab 41p6, the backward image CBT switches to a screen showing information on intelligent construction. The screen showing information on intelligent construction may also be displayed, however, by being superimposed on the backward image CBT or through reduction in the size of the backward image CBT. Furthermore, the overhead view image FV may be switched to the screen showing information on intelligent construction, or the screen showing information on intelligent construction may be displayed by being superimposed on the overhead view image FV or through reduction in the size of the overhead view image FV.

An icon for displaying information on crane mode is displayed on the tab 41p7. When the operator selects the tab 41p7, the backward image CBT switches to a screen showing information on crane mode. The screen showing information on crane mode may also be displayed, however, by being superimposed on the backward image CBT or through reduction in the size of the backward image CBT. Furthermore, the overhead view image FV may be switched to the screen showing information on crane mode, or the screen showing information on crane mode may be displayed by being superimposed on the overhead view image FV or through reduction in the size of the overhead view image FV.

No icons are displayed on the tabs 41p2, 41p3, and 41p5. Therefore, even when the operator operates the tab 41p2, 41p3, or 41p5, the image displayed on the image display part 41 does not change.

The icons displayed on the tabs 41p1 through 41p7 are not limited to the above-described examples, and icons for showing other information may also be displayed.

Next, the operation part 42 is described. As illustrated in FIG. 4, the operation part 42 includes one or more button switches with which the operator makes a selection from among the tabs 41p1 through 41p7, inputs settings, etc. According to the example of FIG. 4, the operation part 42 includes seven switches 42a1 through 42a7 placed in the upper row and seven switches 42b1 through 42b7 placed in the lower row. The switches 42b1 through 42b7 are placed below the switches 42a1 through 42a7, respectively. The number, form, and arrangement of switches of the operation part 42, however, are not limited to the above-described example. For example, the functions of multiple button switches may be integrated in the form of a jog wheel, a jog switch, or the like, or the operation part 42 may be separated from the display device 40. The tabs 41p1 through 41p7 may be directly operated on a touchscreen into which the image display part 41 and the operation part 42 are integrated.

Figure 5:
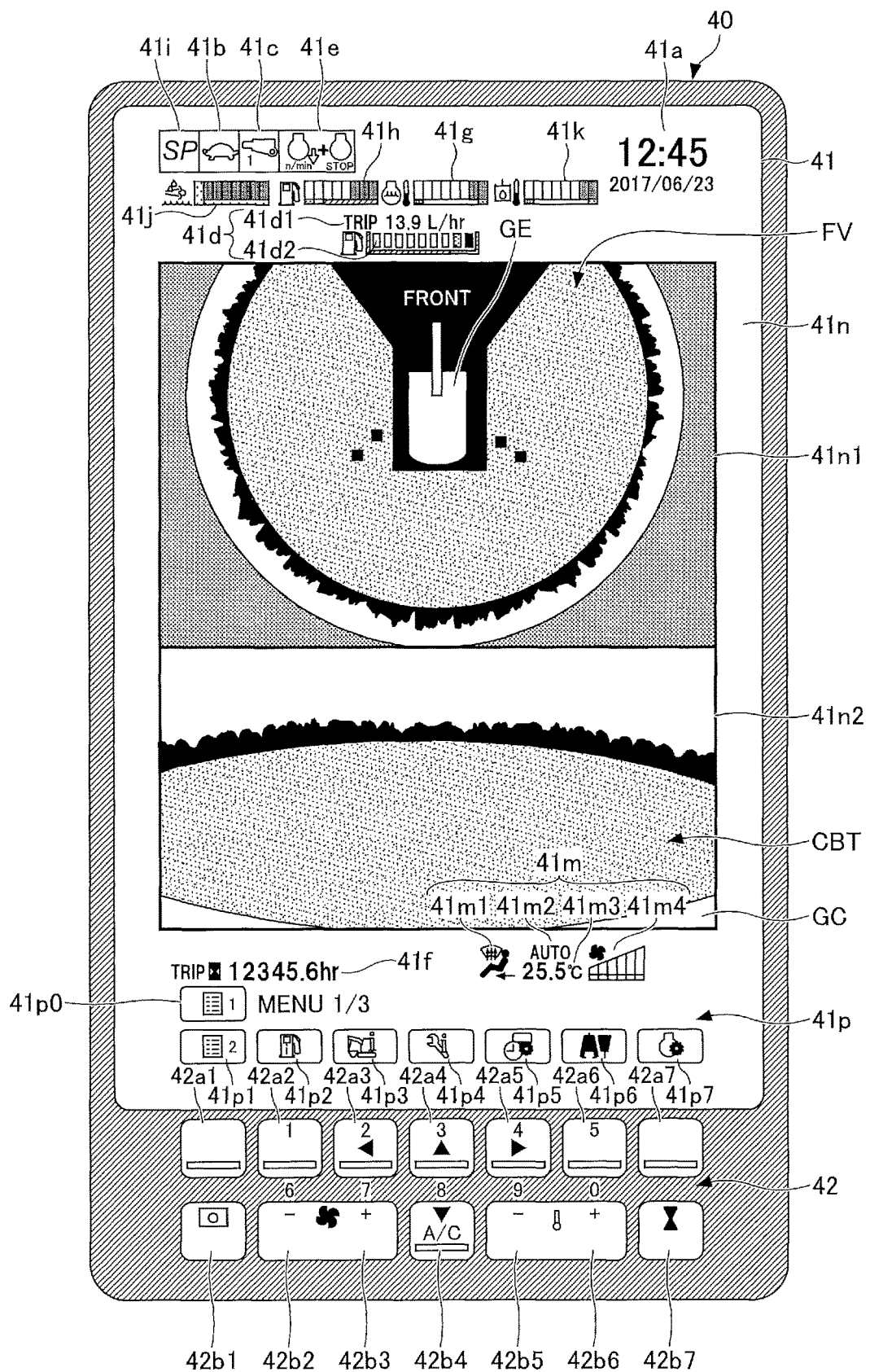
FIG. 5 is a diagram illustrating an example configuration of the image display part and the operation part of the display device.

The switches 42a1 through 42a7 are placed below the tabs 41p1 through 41p7 to correspond to the tabs 41p1 through 41p7, respectively, and operate as switches for selecting the tabs 41p1 through 41p7, respectively. As the switches 42a1 through 42a7 are placed below the tabs 41p1 through 41p7 to correspond to the tabs 41p1 through 41p7, respectively, the operator can intuitively select the tabs 41p1 through 41p7. According to the example of FIG. 4, for example, when the switch 42a1 is operated, the tab 41p1 is selected, so that the menu display area 41p is changed from single-row display to two-row display to display icons corresponding to a first menu are displayed on the tabs 41p2 through 41p7 as illustrated in FIG. 5. Furthermore, in response to the change of the menu display area 41p from single-row display to two-row display, the size of the backward image CBT is reduced. At this point, the size of the overhead view image FV is not changed and is maintained. Therefore, there is no decrease in visibility when the operator checks an area surrounding the shovel 100.

The switch 42b1 is a switch for switching captured images displayed in the image display area 41n. Each time the switch 42b1 is operated, the captured image displayed in the first image display area 41n1 of the image display area 41n is switched from the backward image to the leftward image, to the rightward image, and to the overhead view image, for example. Furthermore, each time the switch 42b1 is operated, the captured image displayed in the second image display area 41n2 of the image display area 41n may be switched from the backward image to the leftward image, to the rightward image, and to the overhead view image, for example. Furthermore, each time the switch 42b1 is operated, a captured image displayed in the first image display area 41n1 and a captured image displayed in the second image display area 41n2 of the image display area 41n may be interchanged. Thus, the switch 42b1 serving as the operation part 42 may switch a screen displayed in the first image display area 41n1 or the second image display area 41n2 or may switch screens displayed in the first image display area 41n1 and the second image display area 41n2. Furthermore, a switch for switching a screen displayed in the second image display area 41n2 may be separately provided.

The switches 42b2 and 42b3 are switches for controlling the air volume of an air conditioner. According to the example of FIG. 4, when the switch 42b2 is operated, the air volume of the air conditioner decreases, and when the switch 42b3 is operated, the air volume of the air conditioner increases.

The switch 42b4 is a switch for turning ON and OFF a cooling/heating function. According to the example of FIG. 4, each time the switch 42b4 is operated, the cooling/heating function is switched between ON and OFF.

The switches 42b5 and 42b6 are switches for controlling the set temperature of the air conditioner. According to the example of FIG. 4, when the switch 42b5 is operated, the set temperature decreases, and when the switch 42b6 is operated, the set temperature increases.

The switch 42b7 is a switch that can change the display of the engine operating time display area 41f.

Furthermore, each of the switches 42a2 through 42a6 and 42b2 through 42b6 is configured to be able to input a number shown on or near the switch. Furthermore, the switches 42a3, 42a4, 42a5, and 42b4 are configured to be able to move a cursor left, up, right, and down, respectively, when the cursor is displayed on the menu screen.

The functions assigned to the switches 42a1 through 42a7 and 42b1 through 42b7 are examples, and the switches 42a1 through 42a7 and 42b1 through 42b7 may be configured to execute other functions.

As described above, when the tab 41p1 is selected while the overhead view image FV and the backward image CBT are displayed in the image display area 41*n*, first menu specific items are displayed on the tabs 41*p*2 through 41*p*7 with the overhead view image FV and the backward image CBT being displayed. Therefore, the operator can check the first menu specific items while looking at the overhead view image FV and the backward image CBT.

Furthermore, in the image display area 41*n*, the overhead view image FV is displayed without a change in size before and after the selection of the tab 41*p*1. There is no decrease in visibility when the operator checks an area surrounding the shovel 100.

Next, another configuration of the image display part 41 and the operation part 42 of the display device 40 is described with reference to FIG. 5. FIG. 5 is a diagram illustrating another configuration of the image display part 41 and the operation part 42 of the display device 40. The screen displayed in the image display part 41 of FIG. 5 is displayed, for example, when the tab 41*p*1 showing the menu specific item icon displayed in the image display part 41 of FIG. 4 is selected.

According to the example of FIG. 5, a tab 41*p*0 and the tabs 41*p*1 through 41*p*7 for calling a condition screen showing the condition of the shovel 100, a settings screen showing the various settings of the shovel 100, or the like are displayed in two rows of an upper row and a lower row in the menu display area 41*p*. The arrangement of the tabs 41*p*0 through 41*p*7, however, is not limited to the two-row arrangement illustrated in FIG. 5, and may be other arrangement.

A first menu specific item icon that is an icon showing currently selected menu specific items is displayed on the tab 41*p*0.

A second menu specific item icon for displaying second menu specific items is displayed on the tab 41*p*1. When the operator selects the tab 41*p*1, the icons associated with the first menu specific items displayed on the tabs 41*p*2 through 41*p*7 switch to icons associated with the second menu specific items.

A fuel efficiency information icon for displaying various kinds of fuel efficiency information is displayed on the tab 41*p*2. When the operator selects the tab 41*p*2, the backward image CBT switches to a screen showing fuel efficiency information. The screen showing fuel efficiency information may be displayed by being superimposed on the backward image CBT or through reduction in the size of the backward image CBT. Furthermore, the overhead view image FV may be switched to the screen showing fuel efficiency information, or the screen showing fuel efficiency information may be displayed by being superimposed on the overhead view image FV or through reduction in the size of the overhead view image FV.

A machine information icon for displaying machine information is displayed on the tab 41*p*3. When the operator selects the tab 41*p*3, the backward image CBT switches to a screen showing machine information. The screen showing machine information may be displayed by being superimposed on the backward image CBT or through reduction in the size of the backward image CBT. Furthermore, the overhead view image FV may be switched to the screen showing machine information, or the screen showing machine information may be displayed by being superimposed on the overhead view image FV or through reduction in the size of the overhead view image FV.

A maintenance information icon for displaying maintenance information is displayed on the tab 41*p*4. When the operator selects the tab 41*p*4, the backward image CBT switches to a screen showing maintenance information. The screen showing maintenance information may be displayed by being superimposed on the backward image CBT or through reduction in the size of the backward image CBT.

Furthermore, the overhead view image FV may be switched to the screen showing maintenance information, or the screen showing maintenance information may be displayed by being superimposed on the overhead view image FV or through reduction in the size of the overhead view image FV.

A date and time setting icon for setting the date and time including the date and the time is displayed on the tab 41*p*5. When the operator selects the tab 41*p*5, the backward image CBT switches to a screen for setting the date and time. The screen for setting the date and time may be displayed by being superimposed on the backward image CBT or through reduction in the size of the backward image CBT. Furthermore, the overhead view image FV may be switched to the screen for setting the date and time, or the screen for setting the date and time may be displayed by being superimposed on the overhead view image FV or through reduction in the size of the overhead view image FV.

An attachment information icon for displaying attachment information is displayed on the tab 41*p*6. When the operator selects the tab 41*p*6, the backward image CBT switches to a screen showing attachment information. The screen showing attachment information may be displayed by being superimposed on the backward image CBT or through reduction in the size of the backward image CBT.

Furthermore, the overhead view image FV may be switched to the screen showing attachment information, or the screen showing attachment information may be displayed by being superimposed on the overhead view image FV or through reduction in the size of the overhead view image FV.

An engine control information icon for displaying the control information of the engine 11 is displayed on the tab 41*p*7. When the operator selects the tab 41*p*7, the backward image CBT switches to a screen showing engine control information. The screen showing engine control information may be displayed by being superimposed on the backward image CBT or through reduction in the size of the backward image CBT. Furthermore, the overhead view image FV may be switched to the screen showing engine control information, or the screen showing engine control information may be displayed by being superimposed on the overhead view image FV or through reduction in the size of the overhead view image FV.

According to the example of FIG. 5, the screen showing fuel efficiency information, the screen showing machine information, the screen showing maintenance information, the screen for setting the date and time, the screen showing attachment information, and the screen showing engine control information are examples of the menu screen.

As described above, when one of the tabs 41*p*2 through 41*p*7 is selected with the overhead view image FV and the backward image CBT being displayed in the image display area 41*n*, the backward image CBT switches to a menu screen showing information corresponding to the selected one of the tabs 41*p*2 through 41*p*7. At this point, there is no change in the display of the overhead view image FV. Thus, because the menu screen is displayed with the overhead view image FV being displayed, it is possible to ensure a peripheral view even with the menu screen being displayed. Therefore, it is possible to operate the shovel 100 with the menu screen being displayed.

Figure 6A:
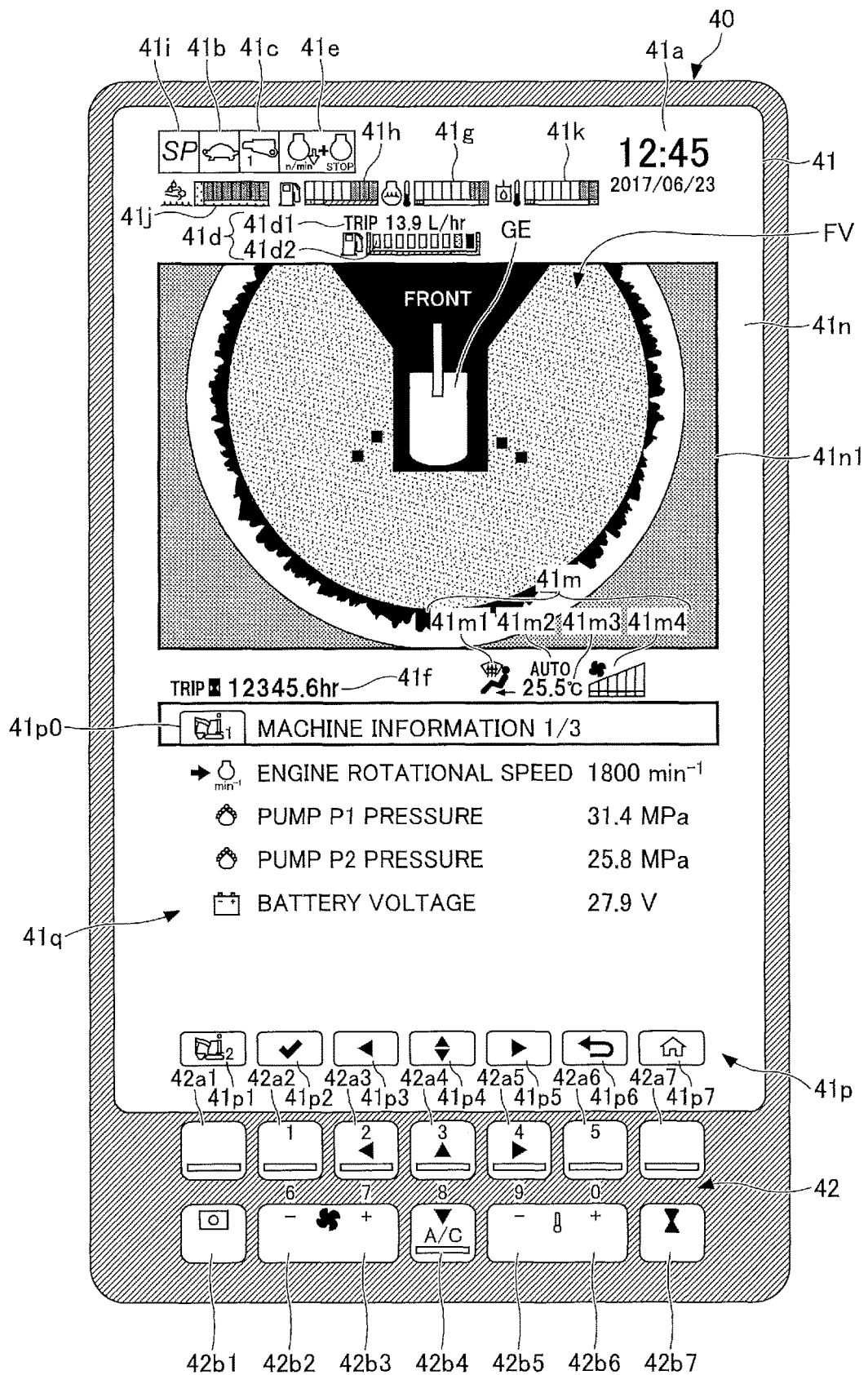
FIG. 6A is a diagram illustrating an example configuration of the image display part and the operation part of the display device.

Next, another example configuration of the image display part 41 and the operation part 42 of the display device 40 is described with reference to FIG. 6A. FIG. 6A is a diagram illustrating another example configuration of the image display part 41 and the operation part 42 of the display device 40. The screen displayed on the image display part 41 of FIG. 6A is displayed, for example, when the tab 41p3 showing the machine information icon displayed in the image display part 41 of FIG. 5 is selected.

According to the example of FIG. 6A, the image display part 41 displays the overhead view image FV, a screen 41q showing machine information, and the tabs 41p0 through 41p7.

The overhead view image FV is an image whose size does not change before and after the selection of the tab 41p3 showing the machine information icon. Thus, the size of the overhead view image FV does not change before and after the selection of the tab 41p3. Therefore, there is no decrease in visibility when the operator checks an area surrounding the shovel 100.

The machine information of the shovel 100 is displayed on the screen 41q showing machine information. According to the example of FIG. 6A, an engine rotational speed, a pump P1 pressure, a pump P2 pressure, and a battery voltage are displayed on the screen 41q showing machine information. The machine information of the shovel 100, however, is not limited to the example of FIG. 5, and may include other information.

A first machine information icon that is an icon showing currently selected machine information is displayed on the tab 41p0.

A first operability setting icon for displaying a first operability setting is displayed on the tab 41p1. When the operator selects the tab 41p1, the icons associated with first machine information displayed on the tabs 41p2 through 41p7 switch to icons associated with the first operability setting. Here, a second machine information icon for displaying second machine information may be displayed on the tab 41p1.

Icons for performing selection, movement, and cancellation with respect to the items displayed on the screen 41q showing machine information are displayed on the tabs 41p2 through 41p6. When the operator makes a selection from among the tabs 41p2 through 41p6, selection, movement, or cancellation is performed.

A home icon for displaying a preset home screen (for example, a default screen) is displayed on the tab 41p7. When the operator selects the tab 41p7, the preset home screen is displayed. For example, the screen illustrated in FIG. 4 is displayed as the home screen.

According to the example of FIG. 6A, the screen 41q showing machine information is an example of the menu screen.

As described above, when the tab 41p3 is selected with the overhead view image FV and the backward image CBT being displayed in the image display area 41n, the backward image CBT switches to a menu screen showing machine information corresponding to the selected tab 41p3. Thus, the menu screen showing machine information is displayed with the overhead view image FV being displayed. Therefore, the operator can operate the shovel 100 to perform troubleshooting and check the operation of functions of the shovel 100 while checking various sensor values and the ON/OFF states of various functions.

Figure 6B:
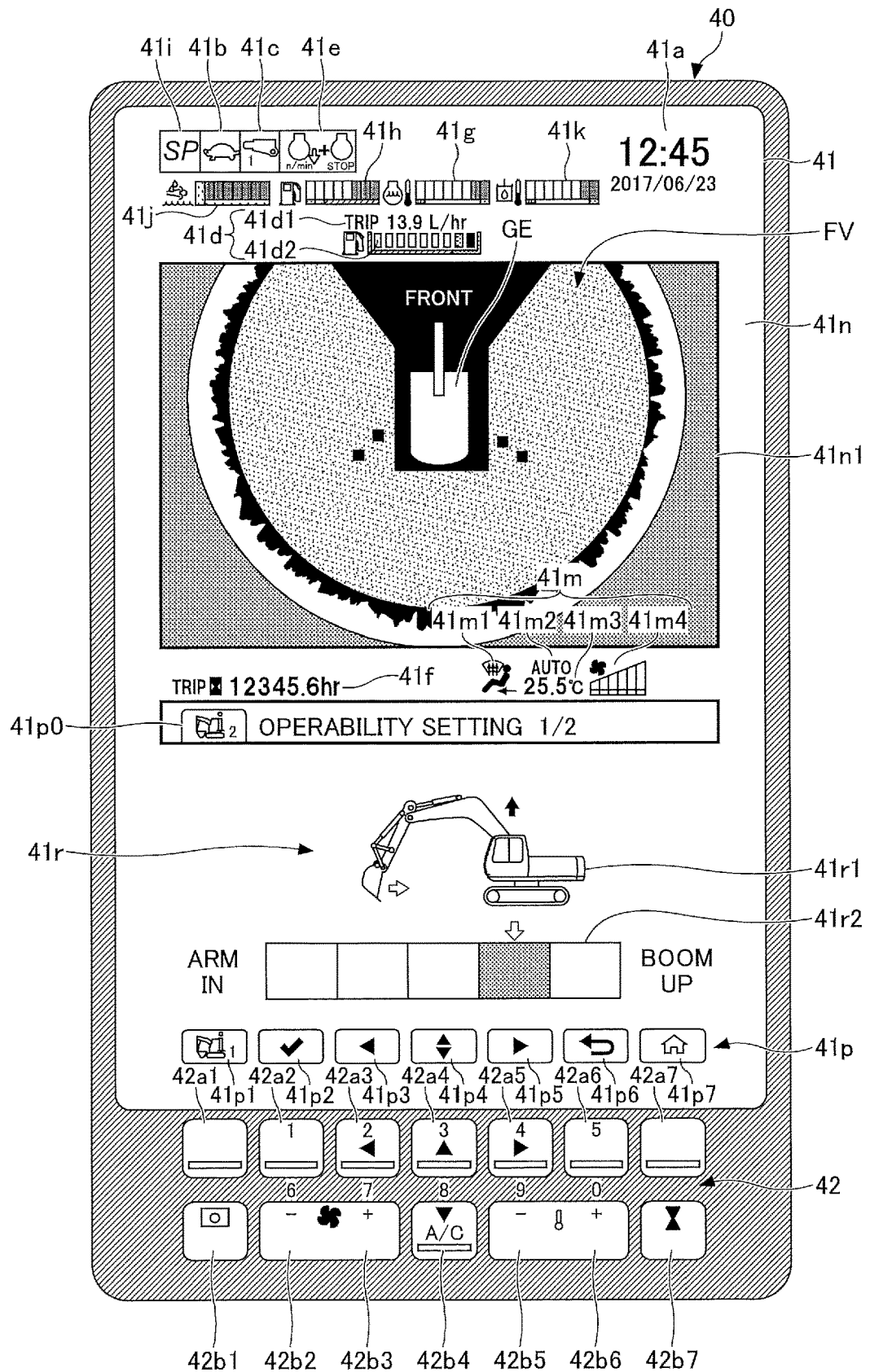
FIG. 6B is a diagram illustrating an example configuration of the image display part and the operation part of the display device.

Next, another example configuration of the image display part 41 and the operation part 42 of the display device 40 is described with reference to FIG. 6B. FIG. 6B is a diagram illustrating another example configuration of the image display part 41 and the operation part 42 of the display device 40. The screen displayed on the image display part 41 of FIG. 6B is displayed, for example, when the tab 41p1 showing an operability setting icon is selected in response to depression of the switch 42a1 in FIG. 6A.

According to the example of FIG. 6B, the image display part 41 displays the overhead view image FV, a screen 41r showing an operability setting, and the tabs 41p0 through 41p7.

The overhead view image FV is an image whose size does not change before and after the selection of the tab showing the operability setting icon. Thus, the size of the overhead view image FV does not change before and after the selection of the showing the operability setting icon. Therefore, there is no decrease in visibility when the operator checks an area surrounding the shovel 100.

The operability setting of the shovel 100 is displayed on the screen 41r showing an operability setting. According to the example of FIG. 6B, on the screen 41r showing an operability setting, a shovel icon image 41r1 and a bar graph 41r2 representing the current set value of the speed balance between an arm closing motion and a boom raising motion for setting the speed balance between an arm closing motion responsive to a lever operation to close the arm 5 and a boom raising motion responsive to a lever operation to raise the boom 4 are displayed. The screen showing the operability setting of the shovel 100, however, is not limited to the example of FIG. 6, and may include other information. For example, on the screen 41r showing an operability setting, a shovel icon image and a bar graph representing the current set value of the speed balance between a turning motion and a boom raising motion for setting the speed balance between a turning motion responsive to the operation of turning the upper turning body 3 and a boom raising motion responsive to a lever operation to raise the boom 4 may be displayed. While a bar graph representing the set value of the speed balance between attachments is used to set the speed balance between attachments according to the above-described configuration, it may also be possible to set the distribution of hydraulic oil flowing to attachments.

The first operability setting icon that is an icon showing a currently selected operability setting is displayed on the tab 41p0.

The first machine information icon for displaying the first machine information is displayed on the tab 41p1. When the operator selects the tab 41p1, the icons associated with the first operability setting displayed on the tab 41p2 through 41p7 switch to the icons associated with the first machine information. Here, a second operability setting icon for displaying a second operability setting may be displayed on the tab 41p1.

Icons for performing selection, movement, and cancellation with respect to the items displayed on the screen 41r showing an operability setting are displayed on the tabs 41p2 through 41p6. When the operator makes a selection from among the tabs 41p2 through 41p6, selection, movement, or cancellation is performed. Furthermore, when the operator operates the switches 42a2 through 42a6 and 42b2 through 42b6, the set value of a selected item is changed.

A home icon for displaying a preset home screen (for example, a default screen) is displayed on the tab 41p7. When the operator selects the tab 41p7, the preset home screen is displayed. For example, the screen illustrated in FIG. 4 is displayed as the home screen.

According to the example of FIG. 6B, the screen 41r showing an operability setting is an example of the menu screen.

As described above, when the tab showing the operability setting icon is selected with the overhead view image FV and the backward image CBT being displayed in the image display area 41n, the backward image CBT switches to a menu screen showing an operability setting corresponding to the selected tab. Thus, the menu screen showing an operability setting is displayed with the overhead view image FV being displayed. Therefore, the operator can check the operation of the shovel 100 while finely tuning various setting values.

Next, yet other example configurations of the image display part 41 and the operation part 42 of the display device 40 are described with reference to FIGS. 7 through 10.

Figure 7:
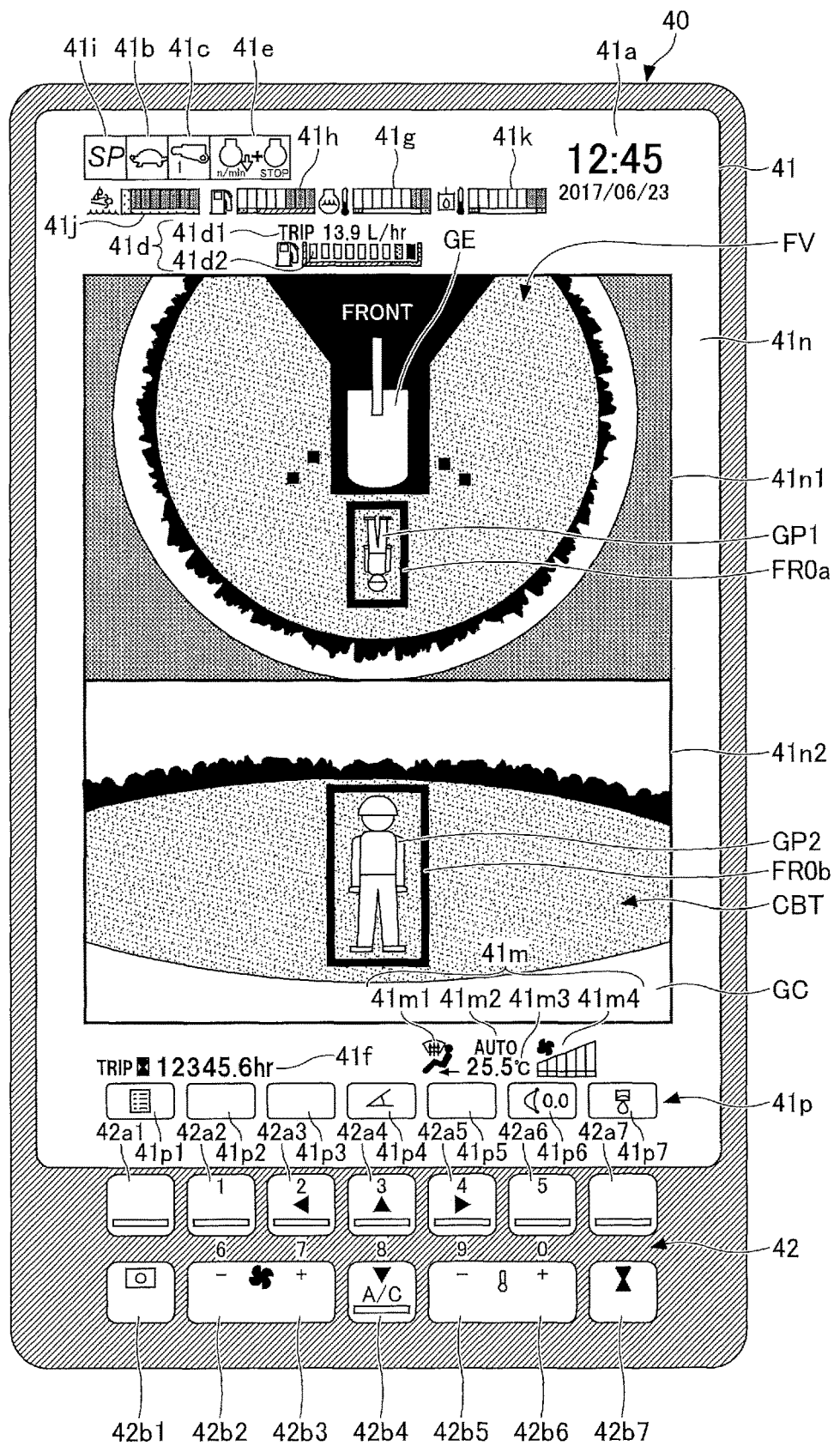
FIG. 7 is a diagram illustrating an example configuration of the image display part and the operation part of the display device.
Figure 8:
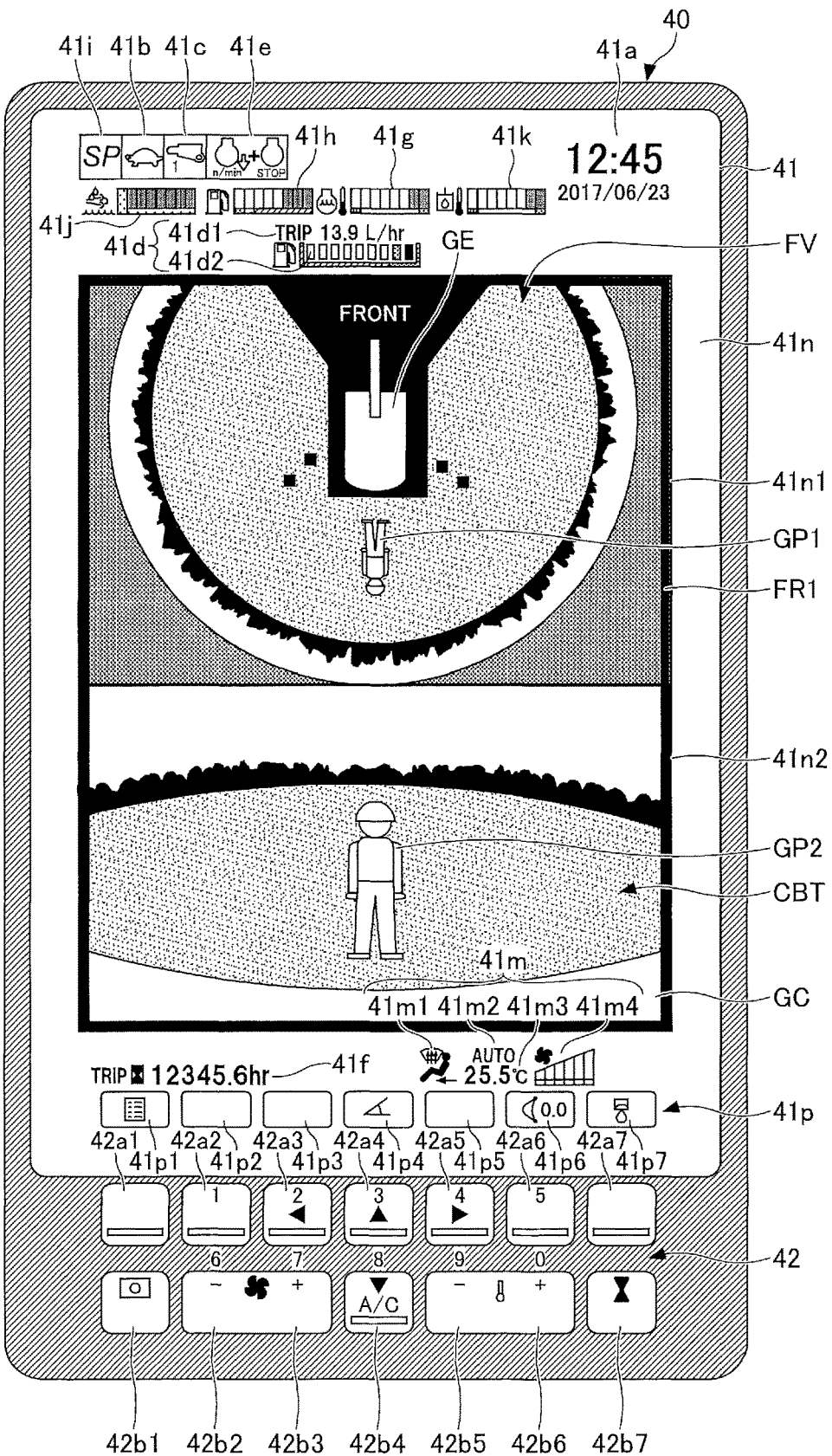
FIG. 8 is a diagram illustrating an example configuration of the image display part and the operation part of the display device.

FIGS. 7 and 8 illustrate example configurations of a screen displayed on the image display part 41 when the image capturing device 80 detects a person behind the shovel 100.

The screen displayed on the image display part 41 of FIG. 7 is different from the screen displayed on the image display part 41 of FIG. 4 in that images GP1 and GP2 of persons are displayed and images of frames surrounding the images GP1 and GP2, respectively, (frame images FR0a and FR0b) are displayed in the first image display area 41n1 and the second image display area 41n2, respectively, but otherwise is equal to the screen displayed on the image display part 41 of FIG. 4.

The screen displayed on the image display part 41 of FIG. 8 is different from the screen displayed on the image display part 41 of FIG. 4 in that an image of a frame highlighting the outer edge of the first image display area 41n1 and the second image display area 41n2 (a frame image FR1) is displayed, but otherwise is equal to the screen displayed on the image display part 41 of FIG. 4. The frame image FR1 of FIG. 8 is larger than the frame images FR0a and FR0b of FIG. 7.

Figure 9:
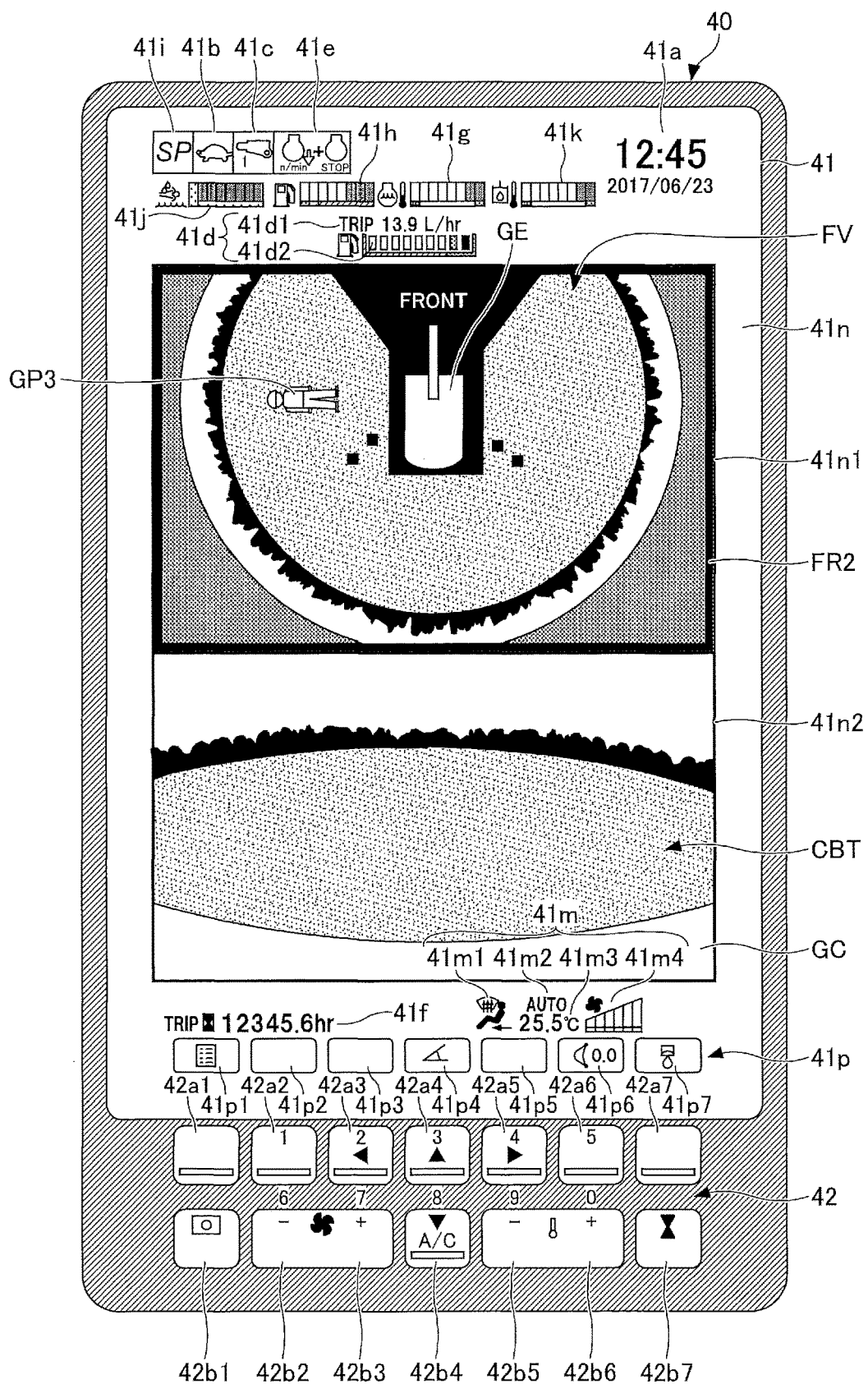
FIG. 9 is a diagram illustrating an example configuration of the image display part and the operation part of the display device.
Figure 10:
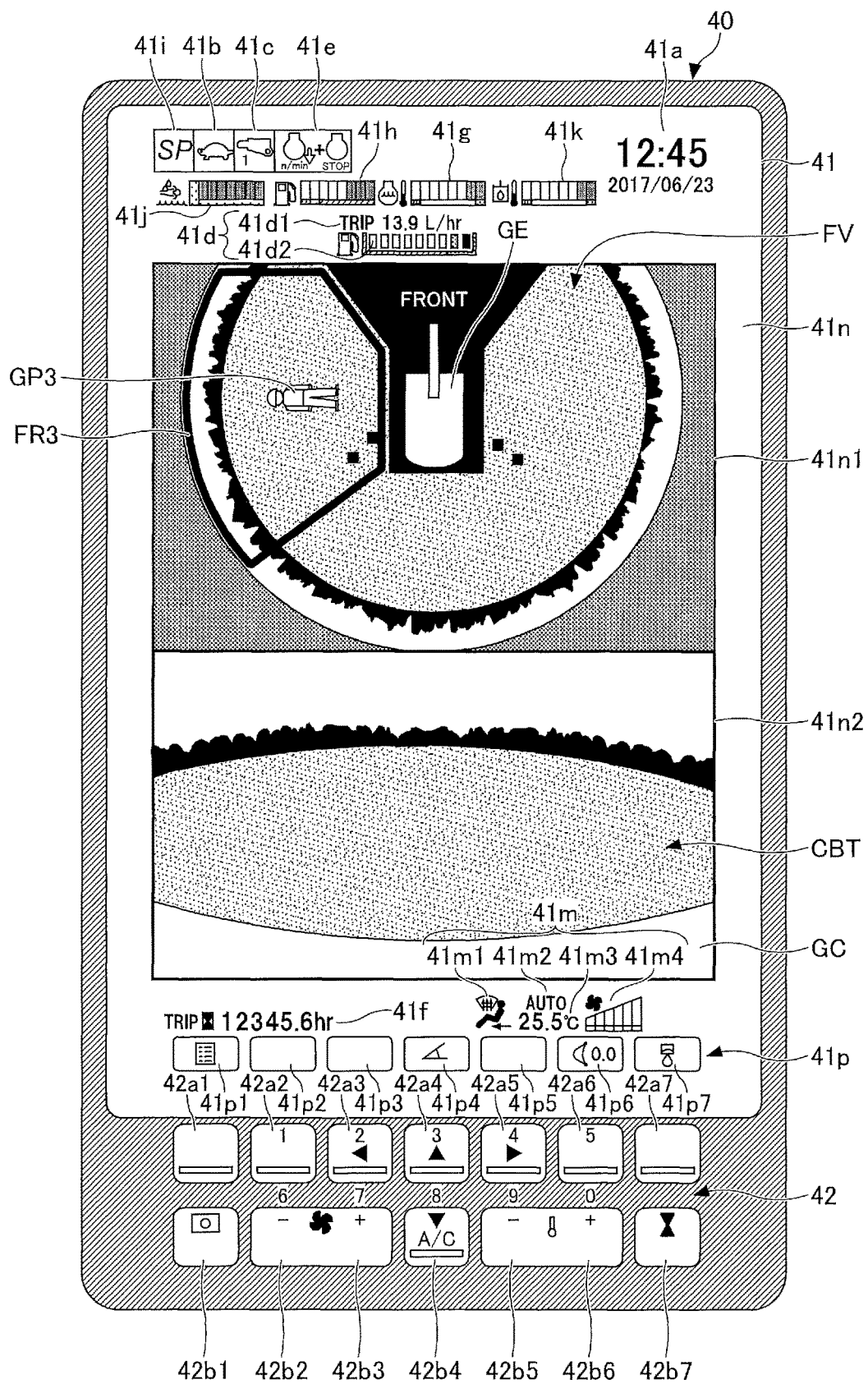
FIG. 10 is a diagram illustrating an example configuration of the image display part and the operation part of the display device.

FIGS. 9 and 10 illustrate example configurations of a screen displayed on the image display part 41 when the image capturing device 80 detects a person to the left of the shovel 100.

The screen displayed on the image display part 41 of FIG. 9 is different from the screen displayed on the image display part 41 of FIG. 4 in that an image GP3 of a person is displayed in the first image display area 41n1 and that an image of a frame highlighting the outer edge of the first image display area 41n1 (a frame image FR2) is displayed, but otherwise is equal to the screen displayed on the image display part 41 of FIG. 4. According to the example of FIG. 9, as no person image is displayed in the second image display area 41n2, the outer edge of the second image display area 41n2 is not displayed in a highlighted manner.

The screen displayed on the image display part 41 of FIG. 10 is different from the screen displayed on the image display part 41 of FIG. 9 in that an image of a frame surrounding the image GP3 (a frame image FR3) is displayed, but otherwise is equal to the screen displayed on the image display part 41 of FIG. 9. The frame image FR3 may be an image of a frame surrounding the entirety of an area including the image GP3 (a left area according to the example of FIG. 10) or may be an image of a frame surrounding only the image GP3.

Furthermore, the shovel 100 is configured to change the color of the frame image FR1 according to the distance between the shovel 100 and a detected person calculated based on the output of the object detector. Specifically, the shovel 100 causes the color of the frame image FR1 to be green when the distance is less than or equal to a first threshold, causes the color of the frame image FR1 to be yellow when the distance is less than or equal to a second threshold smaller than the first threshold, and causes the color of the frame image FR1 to be red when the distance is less than or equal to a third threshold smaller than the second threshold. The same applies to the frame image FR0a, the frame image FR0b, the frame image FR2, and the frame image FR3.

According to this configuration, the shovel 100 can further ensure that the operator of the shovel 100 is aware of the presence of a person in an area surrounding the shovel 100.

An embodiment of the present invention is described above. The above description, however, does not limit the subject matter of the invention, and various variations and improvements may be made without departing from the scope of the present invention.

According to the above-described embodiment, the image display part 41 is configured to display a menu screen in response to the operation of the menu switch of the operation part 42 whether the shovel 100 is operable or inoperable. Here, the image display part 41 may be configured to be able to set screen display such that a peripheral image is forcibly displayed when the shovel 100 becomes operable (or the shovel 100 is operated) while the menu screen is displayed. For example, when the shovel 100 becomes operable (or the shovel 100 is operated) while an overhead view image and a menu screen are displayed as illustrated in FIG. 6A or 6B, switching to a screen displaying an overhead view image and a menu screen as illustrated in FIG. 4 is forced.

Furthermore, for example, the images GP1 through GP3 of persons and the frame images FR0a, FR0b and FR1 through FR3 as illustrated in FIGS. 7 through 10 may be displayed (person detection display may be performed) during display of a menu screen showing machine information while displaying the overhead view image FV (FIG. 6A) or during display of a menu screen showing an operability setting while displaying the overhead view image FV (FIG. 6A).

Furthermore, for example, according to the above-described embodiment, the shovel 100 is configured to notify a person engaged in the work of the shovel 100 of detection of a predetermined object, using the alarm device 49, when the image capturing device 80 detects the predetermined object. The shovel 100 may also be configured to include an automatic stop function to automatically stop the movement of the shovel 100 when the distance between the predetermined object detected by the image capturing device 80 and the shovel 100 is less than or equal to a fourth threshold.

Furthermore, in response to detecting a predetermined object, the alarm device 49 issues an alarm. This alarm may be, for example, canceled by the operation part 42 (for example, the switches 42a1 through 42a7 and the switches 42b1 through 42b7). Furthermore, for example, the operation part 42 (for example, the switches 42a1 through 42a7 and the switches 42b1 through 42b7) is configured to be able to switch the enabled state and the disabled state of the function of detecting a predetermined object and the function of notifying a person engaged in the work of the shovel 100 of detection of a predetermined object. The cancellation of the alarm responsive to the detection of the predetermined object, however, is not limited to the above-described example, and, for example, may be performed with a switch provided on an operating lever or may be performed with a switch placed on the seat left side console on the left side or the seat right side console on the right side of the operator seat. Furthermore, the switching of the enabled state and the disabled state of the function of detecting a predetermined object and the function of notifying a person engaged in the work of the shovel 100 of detection of a predetermined object is not limited to the above-described example, and, for example, may be performed with a switch provided on an operating lever or may be performed with a switch placed on the seat left side console on the left side or the seat right side console on the right side of the operator seat.

What is claimed is:

1. A shovel comprising:
a lower traveling body;
an upper turning body turnably mounted on the lower traveling body;
a cab mounted on the upper turning body;
a plurality of image capturing devices mounted on the upper turning body;
a display device provided in the cab, and
an operation part provided in the cab,
wherein the display device includes an image display part configured to display a captured image captured by at least one of the plurality of image capturing devices and a menu screen, and
the image display part is configured to display the menu screen while displaying the captured image and operating condition information, in response to the operation part being operated, the operating condition information being information on operating condition of the shovel.

2. The shovel as claimed in claim 1, wherein the image display part is configured to display the captured image without changing a size of the captured image before and after the operation part being operated.

3. The shovel as claimed in claim 1, wherein
the captured image includes an overhead view image and a backward image, and
the image display part is configured to display the overhead view image or the backward image with a change in a size of the overhead view image or the backward image before and after the operation part being operated.

4. The shovel as claimed in claim 1, wherein the image display part is configured to display the menu screen while displaying the captured image, in response to the operation part being operated while the shovel is operable.

5. The shovel as claimed in claim 1, wherein the menu screen includes a condition screen showing a condition of the shovel.

6. The shovel as claimed in claim 1, wherein the menu screen includes an operability setting screen showing various settings of the shovel.

7. The shovel as claimed in claim 1, wherein the operation part is provided on the display device.

8. The shovel as claimed in claim 1, wherein the operation part is provided on at least one of an operating lever, a seat left side console, and a seat right side console that are provided in the cab.

9. The shovel as claimed in claim 1, wherein an alarm is issued in response to detection of an object in an area surrounding the shovel while the menu screen is displayed.

10. The shovel as claimed in claim 9, wherein the alarm includes a sound, light, and highlighting on a screen.

11. The shovel as claimed in claim 1, wherein the operating condition information includes information on one or more of fuel efficiency, cumulative operating time of an engine, current temperature condition of engine coolant water, a state of a remaining amount of fuel stored in a fuel tank, a state of a remaining amount of an aqueous urea solution stored in an aqueous urea solution tank, and a state of temperature of hydraulic oil in a hydraulic oil tank.

12. The shovel as claimed in claim 1, wherein
the captured image includes a plurality of captured images captured by the at least one of the plurality of image capturing devices,
the image display part is further configured to display a screen for selecting a menu specific item,
the menu screen is associated with the menu specific item, and
the image display part is further configured to, in response to the operation part being operated to select the menu specific item to switch to the menu screen with the screen for selecting the menu specific item being displayed, display the menu screen with the operating condition information being displayed without at least one of the plurality of captured images being hidden by the menu screen.

13. The shovel as claimed in claim 12, wherein
the plurality of captured images include an overhead view image and a backward image, and
the image display part is further configured to, in response to the operation part being operated to select the menu specific item to switch to the menu screen, switch the backward image to the menu screen and display the menu screen without the overhead view image being hidden by the menu screen.

14. The shovel as claimed in claim 13, wherein switching to a screen displaying the overhead view image and the backward image is forced in response to the shovel becoming operable with the overhead view image and the menu screen being displayed.

* * * * *